US010189128B2

(12) United States Patent
Denkmeier

(10) Patent No.: US 10,189,128 B2
(45) Date of Patent: Jan. 29, 2019

(54) TOOL MAGAZINE FOR A MANIPULATOR

(75) Inventor: Thomas Denkmeier, Traun (AT)

(73) Assignee: TRUMPF Maschinen Austria GmbH & Co. KG., Pasching (AT)

( * ) Notice: Subject to any disclaimer, the term of this patent is extended or adjusted under 35 U.S.C. 154(b) by 912 days.

(21) Appl. No.: 13/820,190

(22) PCT Filed: Aug. 31, 2011

(86) PCT No.: PCT/AT2011/050008
§ 371 (c)(1),
(2), (4) Date: Apr. 4, 2013

(87) PCT Pub. No.: WO2012/027770
PCT Pub. Date: Mar. 8, 2012

(65) Prior Publication Data
US 2013/0203572 A1 Aug. 8, 2013

(30) Foreign Application Priority Data
Sep. 2, 2010 (AT) .................... 1466/2010

(51) Int. Cl.
*B23Q 3/155* (2006.01)
*B23Q 11/08* (2006.01)
(Continued)

(52) U.S. Cl.
CPC ....... *B23Q 3/15526* (2013.01); *B21D 5/0254* (2013.01); *B21D 37/145* (2013.01);
(Continued)

(58) Field of Classification Search
CPC ............ B23Q 3/15513; B23Q 3/15526; B23Q 11/0078; B23Q 11/08; Y10T 483/11;
(Continued)

(56) References Cited

U.S. PATENT DOCUMENTS 3,173,204 A * 3/1965 Anthony ............ B23Q 3/15546
279/126
4,359,815 A * 11/1982 Toyoda .............. B23Q 3/15713
414/225.01
(Continued)

FOREIGN PATENT DOCUMENTS

AT 506 296 8/2009
DE 196 43 163 4/1998
(Continued)

OTHER PUBLICATIONS

English Language Translation of DE 10236342 A1: "Method for fitting tools in magazines in centres for vehicle components involves moving transfer position in parallel time whilst process continues on workpiece," Feb. 19, 2004.*
(Continued)

Primary Examiner — Erica E Cadugan
Assistant Examiner — Michael J Vitale
(74) Attorney, Agent, or Firm — Collard & Roe, P.C.

(57) ABSTRACT

The invention relates to a tool magazine (1) for a manipulator (4) comprising a plurality of tool holding fixtures (2) which are distributed in a preparation area (7), especially in a substantially vertical preparation plane (11). The tool magazine (1), on one side (9) of the preparation area (7), comprises a first access opening (10) facing the manipulator (4) and, on the other side (15) of the preparation area (7), a second access opening (16) facing an operator (13) and the first access opening (10) is associated with a first protective device (17) and the second access opening (16) is associated with a second protective device (18).

12 Claims, 3 Drawing Sheets

(51) Int. Cl.
*B23Q 11/00* (2006.01)
*B23Q 7/04* (2006.01)
*B21D 5/00* (2006.01)
*B21D 55/00* (2006.01)
*B25J 19/06* (2006.01)
*B21D 5/02* (2006.01)
*B21D 37/14* (2006.01)
*B25J 15/04* (2006.01)

(52) U.S. Cl.
CPC ......... *B21D 55/00* (2013.01); *B23Q 3/15513* (2013.01); *B23Q 3/15533* (2013.01); *B23Q 3/15546* (2013.01); *B23Q 3/15573* (2013.01); *B23Q 7/046* (2013.01); *B23Q 11/0078* (2013.01); *B23Q 11/0085* (2013.01); *B23Q 11/08* (2013.01); *B23Q 11/0891* (2013.01); *B25J 15/0491* (2013.01); *B25J 19/06* (2013.01); *B23Q 2003/155411* (2016.11); *Y10S 901/46* (2013.01); *Y10S 901/49* (2013.01); *Y10T 483/115* (2015.01); *Y10T 483/134* (2015.01); *Y10T 483/16* (2015.01); *Y10T 483/1731* (2015.01); *Y10T 483/18* (2015.01)

(58) Field of Classification Search
CPC ............. Y10T 483/115; Y10T 483/134; Y10T 483/1714; Y10T 483/18; Y10T 483/1873; Y10T 483/1882; Y10T 483/1891
USPC ....................... 483/2, 3, 9, 36, 58, 66, 67, 68
See application file for complete search history.

(56) References Cited

U.S. PATENT DOCUMENTS

| | | | |
|---|---|---|---|
| 4,878,288 A * | 11/1989 | Messner | B21D 37/145 483/29 |
| 6,024,681 A | 2/2000 | Latten et al. | |
| 6,325,748 B1 | 12/2001 | Watanabe et al. | |
| 6,786,856 B2 * | 9/2004 | Kato | B23Q 3/1554 483/3 |
| 7,267,642 B2 * | 9/2007 | Arai | B23Q 3/1554 409/232 |
| 2003/0115736 A1 | 6/2003 | Kurz et al. | |
| 2004/0162201 A1 | 8/2004 | Ferrari et al. | |
| 2005/0277529 A1 | 12/2005 | Luscher | |
| 2006/0189464 A1 | 8/2006 | Corbean et al. | |
| 2007/0087924 A1 | 4/2007 | Krosta et al. | |
| 2007/0183774 A1 * | 8/2007 | Tajiri | H01L 21/67276 396/611 |
| 2008/0040911 A1 * | 2/2008 | De Koning | G05B 19/41825 483/1 |
| 2008/0146426 A1 * | 6/2008 | Ishikawa | B23Q 3/15526 483/7 |
| 2010/0017027 A1 | 1/2010 | Truttmann | |

FOREIGN PATENT DOCUMENTS

| | | | | |
|---|---|---|---|---|
| DE | 102 36 342 | | 2/2004 | |
| DE | 10 2005 003220 | | 8/2006 | |
| EP | 0 180 829 | | 5/1986 | |
| EP | 0 566 763 | | 10/1993 | |
| EP | 1 086 781 | | 3/2001 | |
| EP | 1 291 125 | | 3/2003 | |
| EP | 1 604 775 | | 12/2005 | |
| EP | 1 733 840 | | 12/2006 | |
| EP | 1 894 649 | | 3/2008 | |
| EP | 2 067 570 | | 6/2009 | |
| EP | 2138247 A2 * | | 12/2009 | ............ B21D 37/145 |
| FR | 2907357 A1 * | | 4/2008 | ......... B23Q 3/15533 |
| JP | 57144638 A * | | 9/1982 | |
| JP | 2002-113635 A | | 4/2002 | |
| JP | 2002-283277 A | | 10/2002 | |
| JP | 2003-080427 A | | 3/2003 | |
| WO | WO 2010039032 A1 * | | 4/2010 | ........... B23Q 7/1431 |

OTHER PUBLICATIONS

Google Machine Translation of DE 10236342 A1: "Method for fitting tools in magazines in centres for vehicle components involves moving transfer position in parallel time whilst process continues on workpiece," Feb. 19, 2004.*
International Search Report of PCT/AT2011/050008, dated Mar. 1, 2012.

* cited by examiner

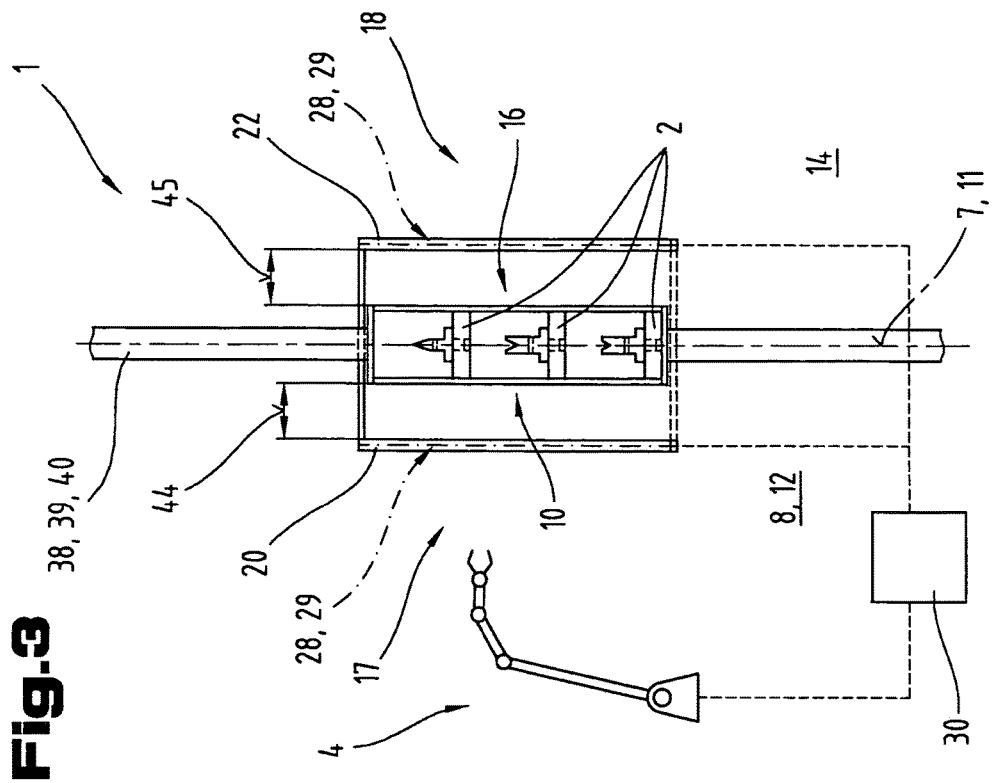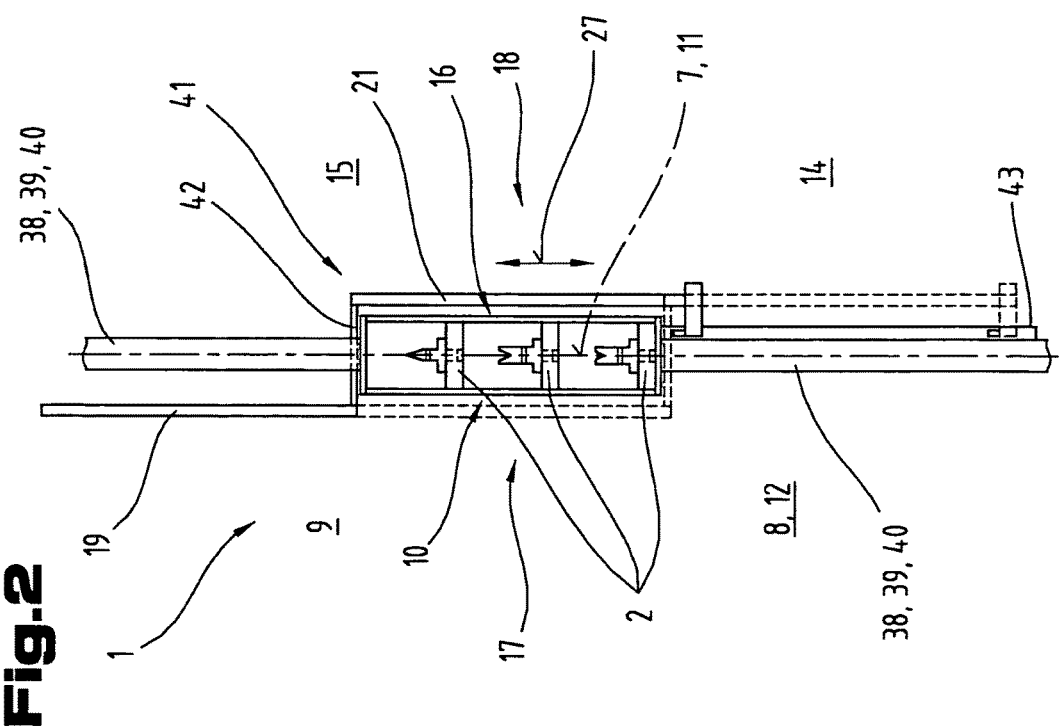

TOOL MAGAZINE FOR A MANIPULATOR

CROSS REFERENCE TO RELATED APPLICATIONS

This application is the National Stage of PCT/AT2011/050008 filed on Aug. 31, 2011 which claims priority under 35 U.S.C. § 119 of Austrian Application No. A 1466/2010 filed on Sep. 2, 2010, the disclosure of which is incorporated by reference. The international application under PCT article 21(2) was not published in English.

BACKGROUND OF THE INVENTION

1. Field of the Invention

The invention relates to a tool magazine.

2. The Prior Art

Tool magazines are an important component for the automatization of flexible processing devices, such as for example bending cells. In bending cells or other production cells, in which the tool exchange is performed by means of a manipulator, the tools required for the production processes are provided in a suitable tool magazine or tool store, which is positioned in the operating area of the manipulator. A tool magazine of this kind is known for example from the patent AT 506 296 B1 of the Applicant. As the operating area of a manipulator for an operator fitting the tool magazine is possibly a danger area, it is generally necessary to stop the manipulator for the period of manually fitting the tool magazine. During the stoppage of the manipulator the tool magazine can be fitted and emptied according to the planned production program by the operator or replaced by another preprepared tool magazine. The stoppage of a manipulator however always involves a loss of productivity time for such a processing device, which is why the time taken for manually fitting the magazine should be kept as short as possible.

SUMMARY OF THE INVENTION

Further production devices with protection devices for safeguarding a tool magazine from dangerous collisions with a manipulator or a mechanically driven tool magazine with an operator are known from EP 0 180 829 A2, DE 10 2005 0003220 A1, DE 196 43 163 A1, EP 1 086 781 A2, EP 2 067 570 A1 and EP 1 733 840 A1.

The objective of the invention is to reduce the time required by an operator for using the tool magazine and the associated stoppage time of the manipulator, without putting the operator at an increased risk.

The objective of the invention is achieved by means of a tool magazine for a manipulator with a plurality of tool holding fixtures arranged distributed in a preparation area, in particular an essentially vertical preparation plane, wherein the tool magazine on the first side of the preparation area has a first access opening facing the manipulator and on the other side of the preparation area has a second access opening facing an operator and the first access opening is assigned a first protection device and the second access opening is assigned a second protection device, according to which the tool magazine is accessible from one side for the manipulator and is accessible on the second side for the operator and the also formed access openings on the tool magazine are provided respectively with suitable protection devices.

The flat arrangement of the tool holding fixtures in a preparation area which is accessible from both sides makes it possible to use such a tool magazine for delimiting the area of danger around the manipulator from the area occupied by an operator. An operator is not forced in this way to stop the manipulator and then perform the necessary fitting procedures on the tool magazine arranged inside a protective fence, but the operator can perform the fitting process on the tool magazine in parallel time, as the manual access of the operator with the associated entry into the danger area around the manipulator only takes place in a very small area, which can be secured by the inner protection device facing the manipulator, whereas the main part of the working area is available for the required movements of the manipulator such as supplying bending workpieces, guiding workpieces during the bending process, removing bent tools etc. By means of the second outerlying protection device any possible dangerous access by the operator at the same time as the access of the manipulator is prevented.

By means of a tool magazine according to the invention fitting processes at the interface between the danger area of the manipulator and the area occupied by the operator can be performed much faster than if the operator has to enter into the danger area delimited by a protective fence or a protective wall before the actual fitting process and has to leave the latter afterwards, wherein also the times necessary for the complete stoppage of the manipulator need to be calculated before entering the danger area.

In order to prevent any danger to the operator when fitting the tool magazine it is an advantage if the first protection device and the second protection device are coupled together and the latter can be activated or deactivated alternately. Simultaneous access by the manipulator and the operator is thereby reliably prevented, which is why fitting the tool magazine can be performed completely safely by the operator.

By means of an embodiment wherein the protective dimensions of the protection devices are greater than the respectively associated internal widths of the access openings, it is ensured that the access openings can be secured over their whole area by the protection devices. The active surfaces are shaped according to the access openings, a rectangular form being an advantage for most applications.

The embodiment of the tool magazine wherein at least one protection device is formed by at least one movably mounted mechanically separating protective wall element enables the effect of the tool magazine according to the invention with little input of control technology, as the mechanically separating protective wall element performs the protective function solely by positioning in front of the respective access opening. In this way it has a mechanical strength which withstands the mechanical stresses to be anticipated by a manipulator or by an operator and whereby a reliable securing of the danger area is ensured. By means of movable positioning it can be positioned by simple means or by simple handling by the operator in front of the associated access opening or removed from the latter. A mechanically separating protective wall element also provides a protective function from the dangerous escape of objects, e.g. workpieces or tools if the manipulator loses control over the object, which may be necessary for specific, prescribed higher safety requirements.

In an embodiment wherein the protective wall element works together with a position sensor connected with a control device acting on the manipulator it is possible to secure the position of a protective wall element relative to the associated access opening by means of the position sensor and to link this position with the control of the manipulator, for example in order to prevent that with an effective protection device on the manipulator side of the tool magazine the latter does not perform a manipulation on the tool magazine for the duration of the activation of the protection device on the manipulator side. For example, the position sensor can be arranged on the operator side and can monitor the closed state of the protective wall element on the operator side. By means of the control of the manipulator with an opened protective wall element on the operator side access to the tool magazine can be blocked by the manipulator. If after manually equipping the tool magazine the protective wall element on the operator side is closed again and positioned in front of the access opening, access to the tool magazine is permitted to the manipulator again by the manipulator control device.

A position sensor for the protective wall element on the operator side of the tool magazine can also be integrated into an emergency stop circuit, with which on opening the protective wall element on the operator side the manipulator is stopped immediately, whereby the operator can activate access to the tool holding fixtures without consideration of the manipulator.

A further increase in safety can be achieved in that the protective wall element is provided with a locking device which is coupled by control technology to the other protection device.

The locking device can be used to block the protective wall element from an opening process as long as the second protection device is not fully effective on the opposite side of the tool magazine. In addition or alternatively, the locking device can also be coupled to the manipulator control and block the opening of the protective wall element until the movements of the manipulator have come to a stop. The opening of the protective wall element by a user is preferably blocked until access by the manipulator to the tool magazine is completed and the protection device on the manipulator side is activated.

An embodiment of the tool magazine in which the protective wall element is made of a see-through material is an advantage for the user as with the see-through protective wall element, for example made of a wire lattice, perforated metal sheet, safety glass or Plexiglas, the contents of the tool magazine can be seen and also with an active protection in the form of the see-through protective wall element it is possible to determine the position and type of tools or free tool holding fixtures contained in the tool magazine.

According to a further embodiment the protection devices can be formed by movably mounted, mechanically coupled protective wall elements, whereby both for the manipulator and also for the operator only time-staggered access to the tool holding fixtures can be ensured, without full access to the control of the manipulator being necessary. The alternate activation of the protection device is ensured by the mechanical coupling of the protective wall elements in each case.

In particular, the protective wall elements in a further embodiment can be arranged to be parallel to one another and offset as well as connected rigidly to one another and adjustably along a guide running parallel to the preparation surface. In this way for the opening and closing of the protective wall elements only a very small amount of space is required and simple guides, in particular linear guides can be used. The relative offset of the protective wall elements arranged on opposite sides of the preparation area necessarily causes the opening or closing of the respective other protective wall elements. Of course, also swivelable protective wall elements are possible, also with mechanical coupling, but a larger amount of space is necessary for this.

Alternatively or in addition to the use of a mechanically separating protective wall element according to a further embodiment at least one protection device can be formed by a contactless protection device with an approach function, which is coupled by control technology with the other protection device and/or with a control device acting on the manipulator. As an example of a contactless operating protection device with an approach function the use of light barriers or light grids is possible. A protection device of this kind does not form a mechanical barrier which blocks access to the tool magazine, but monitors access through or an approach to an access opening and the activation of the other protection device can be triggered on the other side of the preparation area. Thus for example a contactless operating protection device on the operator side can be linked to an emergency stop circuit of the manipulator, whereby upon the access of the user to the tool holding fixtures and the triggered release of the contactless protection device the manipulator is stopped immediately and the danger is thereby removed.

Alternatively, it is possible that during the access of the user to the tool magazine the manipulator does not need to be stopped but simply the access or the approach to the tool magazine is blocked by control technology. If for example contactless protection devices are arranged on both sides of the preparation area the latter can be controlled such that during the access of the manipulator into the tool magazine the triggering of the user-side protection device causes an emergency stop function and if there is no access of the manipulator to the tool magazine, the user-side protection device does not provide an emergency stop function, but only a delimitation of the workspace, this means that for the manipulator in this case access to the tool system is blocked by control technology. The distance of the light barriers from one another and the mesh width of the light grid are selected so that unnoticed access into the danger area by a user or also an unnoticed access of the manipulator is impossible. Alternatively to the use of light barriers or light grids the use of ultrasound proximity sensors or infrared proximity sensors is also possible, whereby essentially the same functionalities can be achieved.

A contactless operating protection device can be used in particular for applications in which there is no danger from objects spun away by the manipulator or a production device which would make a mechanically separating protection device necessary.

When using a contactless acting protection device it can be an advantage if the latter is arranged at a safe distance from the tool magazine, particularly a safe distance from the associated access opening of the tool magazine. In this way sufficient protection is also possible if a certain movement by the manipulator arm is necessary from the moment of triggering the contactless protection device by a moved manipulator or the moved hand of a user from braking to the stoppage of the manipulator arm. The safety distance between the protection device and the tool magazine corresponds to the distance needed to bring the manipulator to a stop.

In an advantageous development of the tool magazine according to a further embodiment a signal device connected to the control device acting on the manipulator is provided, which can be used in particular to inform the user of the impending access of the manipulator to the tool magazine, whereby the manual fitting process can be interrupted in good time if necessary and the user-side protection device can be activated and in this way access to the tool magazine by the manipulator can take place without delay. After the access of the manipulator is complete the manual fitting process can be continued by the user. In practice, because of the preplannable program and because of the tool exchange which can be anticipated by the program an impending tool change can be announced several seconds in advance, preferably longer.

A further advantageous measure for shortening the fitting times of the tool magazine is that the tool holding fixtures are provided with sensor elements for determining tool information contained on an information carrier. The tools used can be identified immediately after inserting the tools into the tool holding fixtures and with the access of the manipulator to an inserted tool there is no need to wait until the user has entered the tool data into the manipulator control. Likewise by means of suitable sensors the position of the tools used can be determined if the tool holding fixtures enable variable positioning by the operator.

The invention also relates to a surface protection device, e.g. a flat protection device, in particular a protective fence or protective wall for delimiting a danger area of the workspace of a manipulator from an area occupied by an operator, which protection device comprises a tool magazine and a bending cell as described herein, with a surface protection device for safeguarding the workspace of a manipulator with a tool magazine according to the invention, in which the previously described advantageous effects of a tool magazine according to the invention can be used.

BRIEF DESCRIPTION OF THE DRAWINGS

For a better understanding of the invention the latter is explained in more detail with reference to the following figures.

In a much simplified schematic view:

FIG. 2 shows a cross section of a further possible embodiment of a tool magazine with mechanically separating protective wall elements;

FIG. 3 shows a cross section of a further possible embodiment of a tool magazine with non-contacting protection devices;

DETAILED DESCRIPTION OF THE PREFERRED EMBODIMENTS

Figure 1:
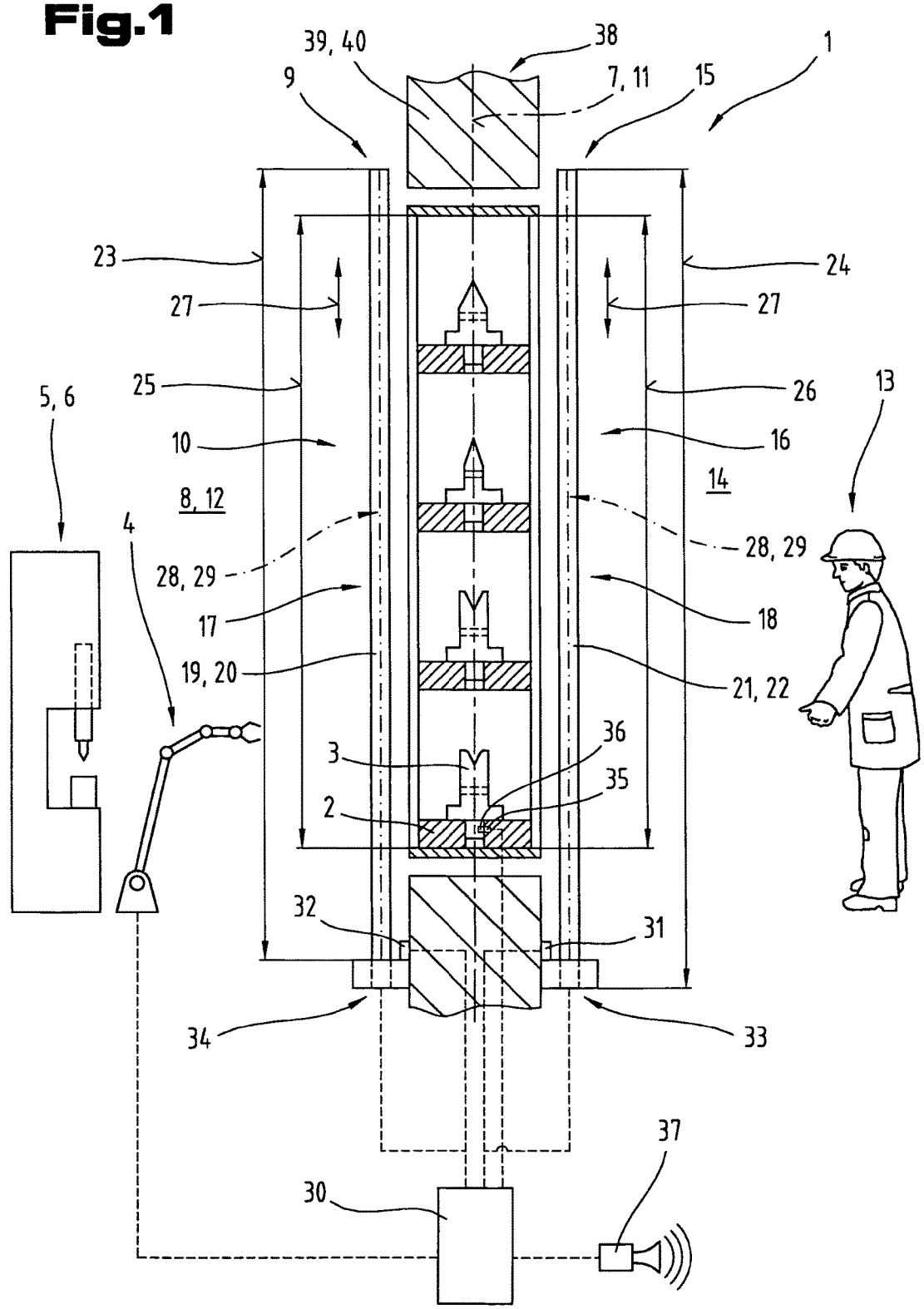
FIG. 1 shows a cross section of a tool magazine according to the invention.

First of all, it should be noted that in the variously described exemplary embodiments the same parts have been given the same reference numerals and the same component names, whereby the disclosures contained throughout the entire description can be applied to the same parts with the same reference numerals and same component names. Also details relating to position used in the description, such as e.g. top, bottom, side etc. relate to the currently described and represented figure and in case of a change in position should be adjusted to the new position. Furthermore, also individual features or combinations of features from the various exemplary embodiments shown and described can represent in themselves independent or inventive solutions.

All of the details relating to value ranges in the present description are defined such that the latter include any and all part ranges, e.g. a range of 1 to 10 means that all part ranges, starting from the lower limit of 1 to the upper limit 10 are included, i.e. the whole part range beginning with a lower limit of 1 or above and ending at an upper limit of 10 or less, e.g. 1 to 1.7, or 3.2 to 8.1 or 5.5 to 10.

FIG. 1 shows a cross section of a tool magazine 1 according to the invention which comprises a plurality of tool holding fixtures 2 for providing tools 3. The tools 3 are held by the tool holding fixtures 2 in defined positions and are provided for the access of a manipulator 4 or there are empty tool holding fixtures 2 for tools 3 to be given out by the manipulator 4. The manipulator 4 can remove tools 3 from the tool magazine 1 and supply them to a production device 5. The manipulator 4 is for example in the form of an industrial robot or articulated robot arm and the production device 5 in the shown exemplary embodiment is in the form of a bending machine 6. Accordingly, the tools 3 provided in the tool magazine 1 are configured for example as bending tools and the latter are inserted by means of the manipulator 4 into the bending machine 6. The manipulator 4 can be used in addition for handling tools 3 for handling workpieces which are processed by the production device 5, which is why the use of an industrial robot for this flexible use is also possible.

The tool holding fixtures 2 have adapted to the respectively used tools 3 holding devices or mechanical interfaces, which with parts of the tools 3 provide exactly defined positions of the tools 3 mounted therein. For the bending tools shown by way of example the tool holding fixtures 2 comprise corresponding grooves, in which the connecting surfaces of the bending tools are positioned. The exact gripping of the tools 3 can thereby be supported by suitable measures, such as by special gripping recesses or bores on the tools 3, into which a specially formed gripping element can engage, such as a gripping mandrel of the manipulator 4.

The tools 3 are arranged distributed in a preparation area 7, wherein the latter is arranged in relation to the manipulator 4 in its workspace 8 so that the manipulator 4 can access the tool holding fixtures 2 and the tools 3 provided therein or can place tools 3 in the tool holding fixtures 2. In addition a first side 9 of the tool magazine 1 or the preparation area 7 can face the manipulator 4 and the tool magazine 1 has at least one first access opening 10, through which the manipulator 4 can access the interior of the tool magazine 1 to the tools 3.

The preparation area 7 is configured in the shown exemplary embodiment as a vertically oriented preparation plane 11, however also in a different manner other basic surface forms of the preparation area 7 are possible, such as for example a curved or angled embodiment and the preparation area 7 can also be configured to be concave or convex from the viewpoint of the manipulator 4. The preparation area 7 and the tool holding fixtures 2 distributed therein are, as already mentioned, arranged inside the possible workspace 8 of the manipulator 4 determined by its extension, which normally represents a danger area 12 and within which an operator 13 is at risk from the moved manipulator 4. At this point it should be noted that the manipulator 4 shown in FIG. 1 is smaller in size in relation to the tool magazine 1 and in reality, like the production device 5 or the operator 13 is in general larger than the dimension of the tool magazine 1.

The tool magazine 1 is fitted manually with tools 3 by the operator 13, wherein said fitting process occurs necessarily in the area 14 occupied by the operator 13. The tool magazine 1 has a second side 15 opposite the first side 9 which faces the operator 13 and comprises at least one second access opening 16, through which the operator has access to the tool holding fixtures 2 or the tools 3. The tool magazine 1 is thus located between the manipulator 4 and the operator 13.

As the inside of the tool magazine 1 is located both in the danger area 12 in the workspace 8 of the manipulator 4 and in the area 14 occupied by the operator 13 on the inside of the tool magazine 1 there is a possible risk for the operator 13 from the manipulator 4, if for example access were to be performed by the operator 13 and the manipulator 4 at the same time.

To remove this potential risk to the operator 13 on the inside of the tool magazine 1 the first access opening 10 is assigned a first protection device 17 and also the second access opening 16 is assigned a second protection device 18. By means of the first protection device 17 and the second protection device 18 the overlap of the danger area around the manipulator 4 with the area 14 occupied by the operator 13 is removed, whereby also any possible risk to the operator 13 is avoided when fitting the tool magazine 1. The first protection device 17 can preferably be configured as a mechanically separating protective wall element 19 or also as a contactless operating protection device 20 with a proximity function. Likewise the second protection device 18 can preferably be configured as a mechanically separating protective wall element 21 or as a contactless operating protection device 22 with a proximity function.

The first protection device 17 and the second protection device 18 have protective dimensions 23 or 24, which are greater than the relative internal widths 25 or 26 of the respective access openings 10 or 16, whereby the access openings 10 and 16 with activated protection devices 17 and 18 are protected completely from access associated with risk by the manipulator 4 or operator 13.

When using a mechanically separating protective wall element 19, 21 access is blocked mechanically, whereby such a protective wall element 19, 21 has a strength which withstands the mechanical loads to be expected in performing the protective function by the manipulator 4 or the operator 13. Furthermore, a protective wall element 19, 21 for releasing the access openings 10, 16 needs to be adjustable as indicated by arrows 27 in FIG. 1 in vertical direction. However, also other movement directions of a protective wall element 19, 21 are possible, such as for example swiveling to one side or swiveling up etc. The direction of movement of a protective wall element 19 or 21 shown by arrow 27 for reactivating or deactivating its protective function in a direction parallel to the preparation area 7 means that the workspace 8 or the occupied area 14 is influenced as little as possible by the adjusting movement.

In a tool magazine 1 with a contactless protection device 20, 22 the latter can be arranged to be fixed, as here the access is not blocked by mechanical separation, but for example by light barriers 28 or light grids 29 indicated by a dashed line, an approach to or access into the inside of the tool magazine 1 is determined and directly based on this measure for removing a possible risk to the operator. The protection measures consist for example in that on the interruption of a light barrier 28 or a light grid 29 of the contactless protection device 22 facing the occupied area 14 by the operator 13 the manipulator 4 is immediately brought to a stop, whereby a collision with the operator 13 or his hands is avoided straight away.

In protection devices 17, 18 in the form of protective wall elements 19, 21 the latter can be coupled together mechanically by a coupling element not shown in FIG. 1, whereby in this case the protective wall elements 19, 21 enable access into the tool magazine 1 either only for the manipulator 4 or the operator 13. In this case the protective wall elements 19 and 21 are connected together by the coupling element so that the opening of the one protective wall element 19, 21 causes the closing of the other protective wall element 21, 19 and vice versa. In this case it is an advantage for safety reasons, if the protective wall elements 19, 21 are arranged offset relative to one another so that a part of the access opening 10 already released by the first protective wall element 19 on the side 15 of the operator is already covered by the second protective wall element 21, whereby the simultaneous access to said tool holding fixture 2 and associated risk to the operator 13 are avoided.

The tool magazine 1 in FIG. 1 shows by way of example four tool holding fixtures 2, which are accessible from both sides 9, 15 through a large access opening 10, 16 for the manipulator 4 or the operator 13. However, it is also possible to divide the tool holding fixtures 2 into several groups, where each group can be configured with a separate access opening 10, 16 with a corresponding protection device 17, 18. Furthermore, the grouping of tool holding fixtures 2 on the first side 9 can be different than on the second side 15, for example all tool holding fixtures 2 in FIG. 1 as shown on the side 9 of the manipulator 4 could be accessible via a large access opening 10, which is secured by the first protection device 17, whereas on the side 15 of the operator 13 two tool holding fixtures 2 are combined into a group which are accessible via two access openings 16 and are secured by two second protection devices 18. Furthermore, also every tool holding fixture 2 can be secured alone with a separate protection device 17, 18. Thus the operator 13 could have access to the tool holding fixtures 2, in that each tool holding fixture 2 is secured with a second protection device 18, for example in the form of a movable protective wall element 21 and the tool holding fixture 2, on which a manual fitting process is being performed by the operator 13 is blocked by control technology for access by the manipulator 4.

In a further possible embodiment of the tool magazine 1 the first protection device 17 and the second protection device 18 are coupled by means of a control device 30 also by control technology, and the protection function is achieved in that the control device 30 operates as a function of the status of the first protection device 17 and/or the second protection device 18 on the manipulator 4.

A control technology safety measure can be that on the access of the operator 13 to one of the tool holding fixtures 2 the movements of the manipulator 4 are stopped completely or the area of the tool magazine 1 is excluded from its possible workspace 8 by control technology. Access of the operator 13 to the tool magazine 1 is determined for example in that the second protection device 18 is configured as a contactless protection device 22 which determines an approach of the operator 13, for example by the interruption of a light barrier 28 or a light grid 29.

In the embodiment of the second protective device 18 in the form of a movable mechanically separating protective wall element 21 the access of the operator 13 can be established for example in that the opening movement of the protective wall element 21 is detected by means of a position sensor 31, which is configured for example as a mechanical switch or as an optical, inductive, capacitive or other type of sensor. In addition or alternatively also the position of a manipulator-side protective wall element 19 can be monitored by a position sensor 32, whereby the closed position of the manipulator-side protective wall element 19 can be queried.

To increase safety also the mechanically separating protective wall elements 19 and 21 can be secured by means of a locking device 33 on the operator side 15 and/or a locking device 34 on the manipulator side 9. Said locking devices 33 and 34 can be used to release an opening movement in independently adjustable, mechanically uncoupled protective wall elements 19 and 21 only when the respective other protective wall element 21, 19 has reached the closed state. The user-side locking device 33 can also be used so that it is only possible to open the outer protective wall element 21 if the area around the tool magazine 1 has been blocked by the control technology for the manipulator 4.

To facilitate the manual fitting processes for the operator 13, it is an advantage when using mechanically separating protective wall elements 19, 21 if at least the user-side outer protective wall element 21 is made completely or at least partly from a see-through material, for example a grid, Plexiglas or safety glass, whereby the operator can optically determine the fitting of the tool magazine without opening the protective wall element 21.

A further way of helping the operator 13 can be to fit the tool holding fixtures 2 with sensor elements 35, by means of which information about a tool 3 inserted into a tool holding fixture 2 can be determined automatically and sent to the control device 30. In particular, the tools 3 can be provided with an information carrier 36 which can contain a tool identification and/or tool data. By means of measuring sensor element 35 it is possible alternatively or in addition to determine the position of a tool 3 in relation to the tool holding fixture 2 and also transmit this position to the control device 30. In this way the tool holding fixtures 2 can be fitted flexibly with different tools 3 in different dimensions and also in variable positions. The transfer of information from the information carrier 36 can be performed for example by contact via electrical contacts or also without contact via inductive, capacitive or optical transmission. The information carrier 36 can for example be configured as a non-volatile memory chip, a RFID element, a barcode or other form of information carrier.

A further support for the operator during the fitting process can consist of calculating in advance the time of the planned access of the manipulator 4 to the tool magazine 1 by means of the control device 30 and telling the operator 13 by means of a signal device 37 connected to the control device 30 of an impending access of the manipulator 4, for example by an acoustic and/or optical signal or by displaying the time remaining for the manual fitting process up to the planned access by the manipulator 4. If the operator has not yet completed the manual fitting process at this time and the user-side protection device 18 is not yet activated the program processing of the manipulator 4 is stopped.

FIG. 1 also shows that the tool magazine 1 according to the invention can be part of or an addition to a flat protection device 38, in particular in the form of a protective fence 39 or a protective wall 40, with which the workspace 8 of the manipulator 4 and the danger area 12 caused thereby is delimited from the area 14 occupied by the operator 13. The tool magazine 1 thereby forms a part of the flat protection device 38.

The flat protection device 38 with the tool magazine 1 according to the invention can in particular form the outer delimitation and thereby a component of a bending cell, which borders the manipulator 4 and a bending machine 6 arranged in the workspace 8 of the manipulator 4 and prevents the risk to people approaching.

FIG. 2 shows a further exemplary embodiment of a tool magazine 1 according to the invention in which the first protection device 17 is formed by a movable first protective wall element 19 on the first side 9, the manipulator side, of the tool magazine 1 and the second protection device 18 in the form of a movable protective wall element 21 are arranged on the second side 15, the user side, opposite the preparation area 7. The protective wall elements 19, 21 have dimensions, which are greater than the access openings 10 and 16 protecting from access and are arranged offset relative to one another so that they overlap, at least slightly, in the frontal direction at right angles to the preparation area 7, in an overlapping area 41. In addition, the protective wall elements 19, 21 are connected together mechanically by means of a coupling element 42, that is a displacement of the protective wall element 19 at the same time causes a displacement of the opposite protective wall element 21.

In the exemplary embodiment shown in FIG. 2 the protective wall elements 19 and 21 can be displaced along a guide 43 parallel to the preparation area 7, whereby both the workspace 8 of the manipulator 4, which shows the danger area 12 to be delimited, and the area 14 occupied by an operator 13 are affected as little as possible by the adjustment of the protective wall elements 19, 21. In a preparation area 7, which is not formed by a preparation plane 11, but also extends into a third dimension, the guide 43 can be adjusted according to the course of the preparation area 7, for example curved. The guide 43 can be arranged on an adjoining, flat protection device 38 in the form of a protective fence 39 or a protective wall 40 or can also be a component of the tool magazine 1 itself.

FIG. 2 shows clearly the reciprocal activation or deactivation of the respective protection device 17 and 18 by adjusting the corresponding protective wall elements 19 and 21 and is shown in an initial position shown in solid lines, in which access to the tool holding fixtures 2 is possible through the first access opening 10 and access is blocked through the second access opening 16, and in dashed lines in the alternative position in which the access to the first access opening 10 is blocked and in turn access is permitted through the second access opening 16.

The adjusting movement of the movable protective wall elements 19, 21 can be performed in different ways in different embodiments of the invention. Thus for example the adjusting movement can be performed manually by the operator 13 or can also be performed or supported by suitable, not shown adjusting drives, for example linear drives, pneumatic cylinders, toothed belt drives etc. Of course, in all of the embodiments as also shown in FIG. 1 corresponding position sensors 31, 32 and locking devices 33, 34 can be provided which can also be connected to a control device 30 of the tool magazine 1 or the manipulator 4. Furthermore, also any drives for the movable protective wall elements 19, 21 can be connected to the control device 30 in order to allow access to the operator 13 only in safe operating conditions.

FIG. 3 shows a further and possibly independent embodiment of the tool magazine 1, in which the same reference numerals and component names have been used for the same parts as in the preceding FIGS. 1 and 2. To avoid unnecessary repetition reference is made to the detailed description in the preceding FIGS. 1 and 2. The exemplary embodiment according to FIG. 3 shows a tool magazine 1 according to the invention with two protection devices 17 and 18 arranged opposite the preparation area 7 or the preparation plane 11, which devices are formed by contactless operating protection devices 20 and 22 with an approach function. The function of the contactless protection devices 20, 22 has already been described in detail with reference to FIG. 1 and is not repeated at this point.

A further feature for increasing the safety of the operator 13 is found in the embodiment according to FIG. 3 in that between the first contactless protection device 20 and the associated access opening 10 there is a safety distance 44 which means that between recognizing the approach of the manipulator 4 or a hand of the operator 3 to the tool magazine 1 up to the final stopping of the manipulator movement there is a sufficient distance for braking the possibly fast manipulator movement. In addition, as also shown in FIG. 3, the second contactless protection device 22 can also have a distance 45 from the associated access opening 16, whereby also there is a time delay between recognizing the approach of the operator 13 and the actual access of the operator 13 to the danger area in which the danger of the manipulator 4 for example by stopping the latter is removed.

The safety distances 44 and 45 can be selected to be different or the same depending on the required stopping distances for the manipulator 4 or according to the time intervals for removing the risk.

Figure 4:
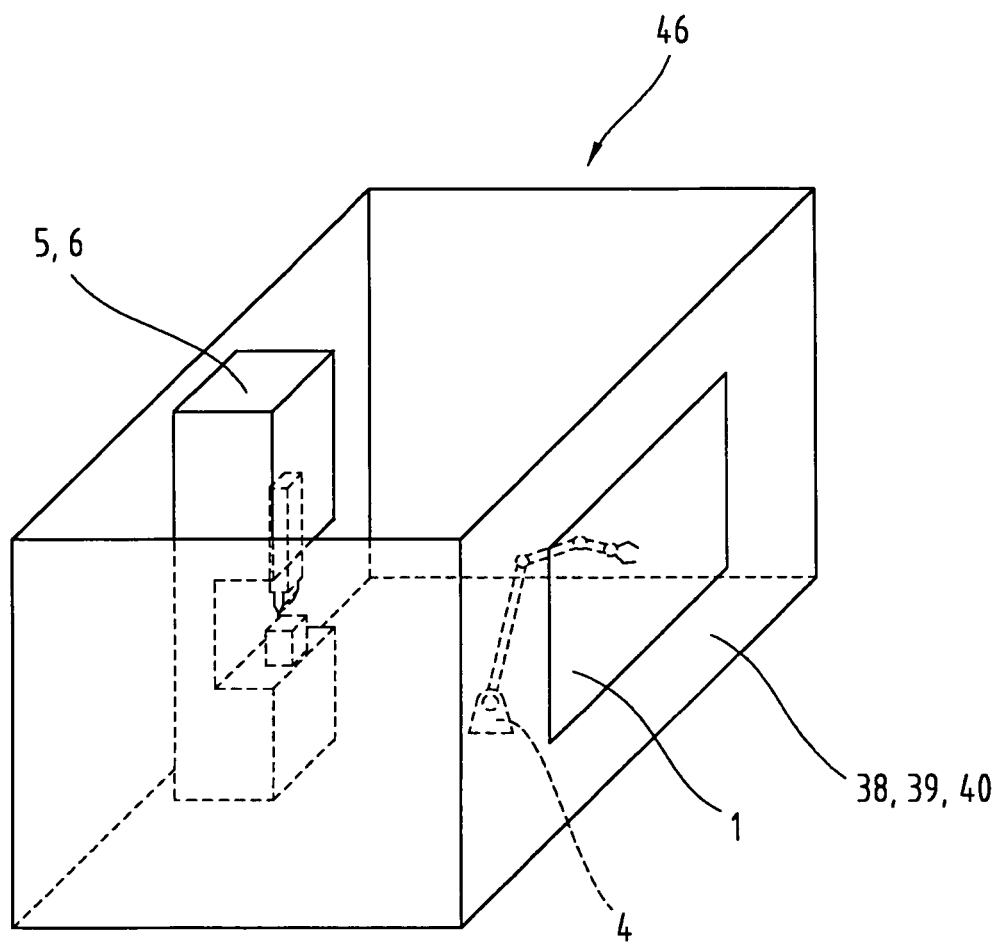
FIG. 4 shows a view of a bending cell with a delimitation surrounding a tool magazine according to the invention.

FIG. 4 shows an overall view of a bending cell 46, in which a production device 5 in the form of a bending machine 6 or bending press is combined with a manipulator 4 and the latter are surrounded by a protection device 38, in the form of a protective fence 39 or protective wall 40. By means of the manipulator 4 in addition to the workpiece handling inside the bending cell 46 a tool change can also be performed on the production device 5, the tools 3 being provided in a tool magazine 1 according to the invention. The tool magazine 1 thereby forms a part of the surrounding protection device 38.

The exemplary embodiments show possible embodiment variants of the tool magazine 1, whereby it should be noted at this point that the invention is not restricted to the embodiment variants shown in particular, but rather various different combinations of the individual embodiment variants are also possible and this variability, due to the teaching on technical procedure, lies within the ability of a person skilled in the art in this technical field. Thus all conceivable embodiment variants, which are made possible by combining individual details of the embodiment variants shown and described, are also covered by the scope of protection.

Finally, as a point of formality, it should be noted that for a better understanding of the structure of the tool magazine 1 the latter and its components have not been represented true to scale in part and/or have been enlarged and/or reduced in size.

The underlying problems addressed by the independent solutions of the invention can be taken from the description.

Mainly the individual embodiments shown in FIGS. 1; 2; 3; 4 can form the subject matter of independent solutions according to the invention. The objectives and solutions according to the invention relating thereto can be taken from the detailed descriptions of these figures.

LIST OF REFERENCE NUMERALS 1 tool magazine
2 tool holding fixture
3 tool
4 manipulator
5 production device
6 bending machine
7 preparation area
8 workspace
9 first page
10 first access opening
11 preparation plane
12 danger area
13 operator
14 occupied area
15 second page
16 second access opening
17 first protection device
18 second protection device
19 protective wall element
20 protection device
21 protective wall element
22 protection device
23 dimension
24 dimension
25 inside width
26 inside width
27 arrow
28 light barriers
29 light grid
30 control device
31 positioning sensor
32 position sensor
33 locking device
34 locking device
35 sensor element
36 information carrier
37 signal device
38 protection device
39 protective fence
40 protective wall
41 overlapping area
42 coupling element
43 guide
44 safety distance
45 safety distance
46 bending cell

The invention claimed is:
1. A bending cell comprising:
a bending machine,
a manipulator,
a bending tool magazine,
a first protection device,
a second protection device, and
a control device for safety, the control device being operatively coupled to the first protection device and to the second protection device, wherein
the manipulator is configured at least for handling a workpiece and for performing bending tool exchange,
the manipulator is configured for removing bending tools from the bending tool magazine and for inserting the bending tools into the bending machine,
the bending tool magazine comprises a plurality of bending tool holding fixtures arranged distributed in a preparation area,
the bending tool magazine further comprises a first side facing the manipulator, a first access opening in the first side, a second side opposite to the first side and facing away from the manipulator and away from the bending machine, and a second access opening in the second side, the manipulator is positioned to remove the bending tools from the bending tool magazine via the first access opening in the first side of the bending tool magazine, the manipulator is operable within the workspace, which is determined by an extension of the manipulator, between the bending tool holding fixtures arranged in the preparation area and the bending machine, the workspace comprises a first part comprising more than fifty percent of the workspace, said first part of the workspace comprising the bending machine, the first access opening is assigned the first protection device for separating the preparation area from the first part of the workspace of the manipulator, and the second access opening is assigned the second protection device for separating the preparation area from an area occupied by an operator, and via the control device, the first and the second protection devices are activated and deactivated alternately, such that only one of the first access opening and the second access opening is open at each time to allow access into the tool magazine, and in order to provide access through the first access opening, the first protection device is moved vertically in a first direction with respect to said first access opening, and in order to provide access through the second access opening, the second protection device is moved vertically in a second direction, which is opposite to the first direction, with respect to said second access opening, and such that when the preparation area is separated from the first part of the workspace by the first protection device, the first part of the workspace is available for:
movements of the manipulator,
supplying the workpiece to the bending machine,
guiding the workpiece during a bending process, and
removing the workpiece from the bending machine after the workpiece has been bent by a bending tool.

2. The bending cell as claimed in claim 1, wherein the first and second protection devices have protective dimensions greater than respectively associated internal widths of the access openings.

3. The bending cell as claimed in claim 1, wherein at least one of the first protection device and the second protection device is formed by at least one movably mounted mechanically separating protective wall element.

4. The bending cell as claimed in claim 3, wherein the at least one protective wall element works together with a position sensor connected with the control device.

5. The bending cell as claimed in claim 3, wherein the first protection device is formed by the at least one movably mounted mechanically separating protective wall element wherein the at least one protective wall element is provided with a locking device, which is coupled by control technology to the second protection device and/or the control device.

6. The bending cell as claimed in claim 3, wherein the at least one protective wall element is made from a see-through material.

7. The bending cell as claimed in claim 3, wherein the first and second protection devices are formed by respective movably mounted and mechanically coupled protective wall elements.

8. The bending cell as claimed in claim 7, wherein the respective protective wall elements are rigidly connected to one another, are arranged to be parallel and offset to one another, and are displaceable along a corresponding guide running parallel to the preparation area.

9. The bending cell as claimed in claim 8, wherein the respective protective wall elements are rigidly connected to one another via a coupling element, and displacement of the first protective element causes displacement of the second protective element.

10. The bending cell as claimed in claim 3, wherein the second protection device is formed by the at least one movably mounted mechanically separating protective wall element wherein the at least one protective wall element is provided with a locking device, which is coupled by control technology to the first protection device and/or the control device.

11. The bending cell as claimed in claim 1, wherein a signal device is provided, the signal device being connected to the control device, which acts on the manipulator.

12. The bending cell as claimed in claim 1, wherein the plurality of bending tool holding fixtures are provided with respective sensor elements for detecting a bending tool position and/or bending tool information contained on an information carrier.

* * * * *